No. 640,524. Patented Jan. 2, 1900.
J. H. J. BARTELS.
APPARATUS FOR MAKING BARRELS, PIPES, OR CYLINDERS.
(Application filed May 13, 1899.)
(No Model.) 2 Sheets—Sheet 2.
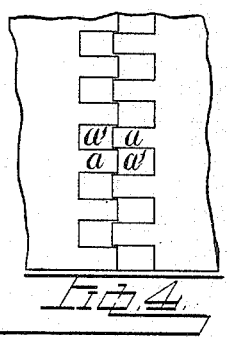
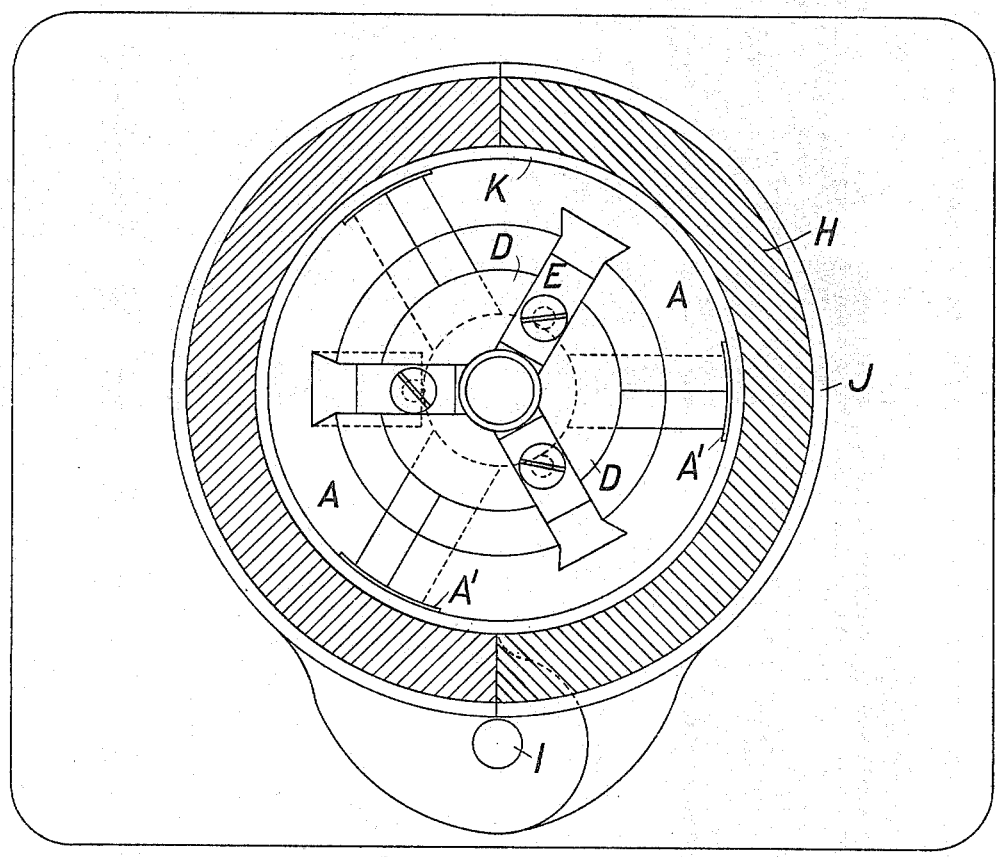
Witnesses
Inventor
Johann H. J. Bartels,
per John F. Nolan
Asso. Attorney

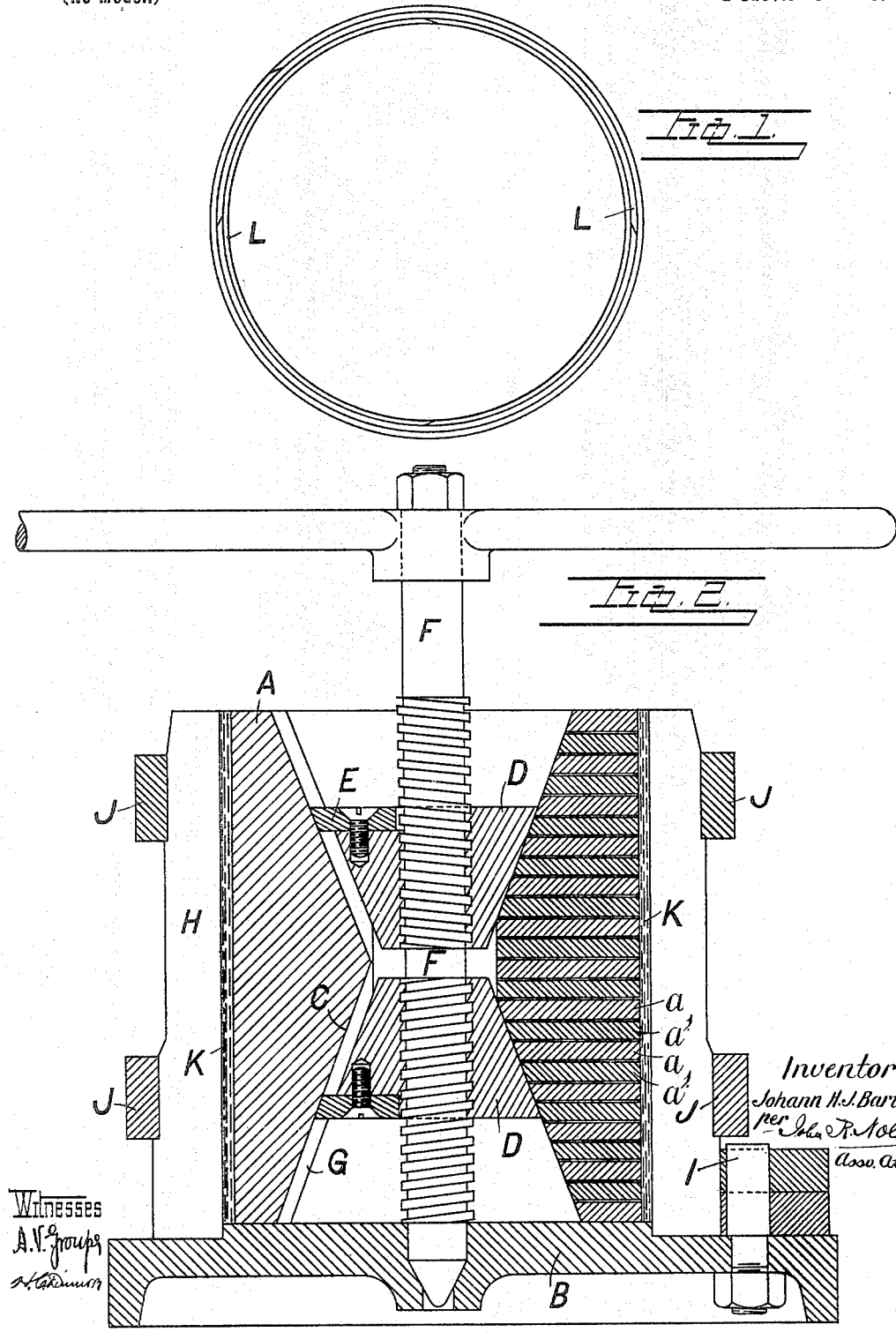

United States Patent Office.

JOHANN H. J. BARTELS, OF LIVERPOOL, ENGLAND.

APPARATUS FOR MAKING BARRELS, PIPES, OR CYLINDERS.

SPECIFICATION forming part of Letters Patent No. 640,524, dated January 2, 1900.

Application filed May 13, 1899. Serial No. 716,650. (No model.)

*To all whom it may concern:*

Be it known that I, JOHANN HEINRICH JULIUS BARTELS, a subject of the Emperor of Germany, residing in Liverpool, in the county of Lancaster, England, have invented certain new and useful Improvements in Apparatus for Making Barrels, Pipes, or Cylinders, of which the following is a specification.

This invention relates to apparatus for the production of barrels, pipes, or cylinders from layers of veneer or the like; and, as generally stated, the invention comprises, in combination, a fixed outer cylinder or former, an inner expansible segmental die cylindrical on the exterior and oppositely inclined on the interior from an apex at or about the middle of the die toward the ends thereof, and oppositely-disposed cones coacting with the inner inclined portions of said die and slidingly coupled to the respective segments thereof, whereby the longitudinal movement of said cones will expand or contract the die in a manner to compress or release the substance between the die and the outer cylinder.

The invention also comprises novel features of construction and combinations of parts, which will be hereinafter particularly described and claimed.

In the drawings, Figure 1 is an end view of a mantle of a barrel such as my apparatus is designed to produce. Fig. 2 is a sectional elevation of said apparatus; Fig. 3, a sectional plan, and Fig. 4 a front view of two segments at their point of junction.

Referring to the figures, A is a cylindrical die or core divided for the purpose of making it expansible into three or more separate segments, which are shaped on the outside to give a bilge to the composite sheet of veneers or may be made straight, as in the arrangement shown in the drawings. These segments at their adjacent edges are provided with teeth or projections $a$, with depressions $a'$ between, the projections on the respective segments engaging in or entering the depressions in the adjacent segments, as clearly shown in Fig. 4, and thus when these segments expand they do not separate, as the space which would otherwise be formed between them is in great measure filled up by the projections entering the opposite depressions. A very thin plate $A'$ may be placed over the surface of the segments at their intermeshing edges, if desired, thus covering them entirely, the teeth forming sufficient support therefor, as shown in Fig. 3 only. The segments A are mounted on the plate or frame B in such a manner that each segment shall have a free radial movement. They are wedge-shaped at C on their inside faces in such a manner as to slope from an apex in the middle toward their ends, and between these wedge-shaped pieces I place cones D, which are respectively connected to the cylindrical dies aforesaid by the plates E, which are secured to the cones and dovetailed to the segments A, thus preventing the cones D separating from the segments A, while permitting a longitudinal movement of the cones D independent of the segments. Through the center of these cones passes a rotary screw F, threaded at one end with a left-hand thread and at the other with a right-hand thread, so that the rotation of the screw in one direction will cause the cones to approach each other and at the same time force the respective segments of the cylinder A outward, or by rotating in the opposite direction the cones will move away from each other and draw the segments A of the cylinder inward, owing to their being coupled to the cylinder by the dovetails G. Concentrically around the apparatus I place the cylinder or die H, of the exact size and shape inside that is required for the barrel, cylinder, or other article. This cylinder or die is made in two parts hinged together at I and fastened around with removable strong metallic bands J.

The mode of action is as follows: The layers of veneer K are placed between the outside of the expansible dies A and the inside of the cylinder H, the veneers being bent by hand and the respective layers arranged to break joint. These layers are placed concentrically around each other, with the grain of each veneer preferably transverse to the longitudinal axis of the mantle. Each veneer is coated with glue or other waterproof cement, and the cylinder H and dies A may be heated to assist in the process of pressing the layers into one solid mass. For this purpose the dies A may be made hollow and heated by steam, a flexible-pipe connection being provided so as to allow the dies free radial movement. The screw F is then turned by hand or other power, the result of which is to draw the cones G closer together, and thus expand the dies A and compress the composite sheet K, causing it to assume the shape required. The pressure, as will be seen, is directed from the inside of the composite sheet, the outside cylinder H being stationary. The sheet can be pressed either hot or cold by hand or by power. To release the composite sheet from between the cylinder H and dies A, the pressure of the latter is relaxed by turning the screw F in the opposite direction, the metallic bands J are lifted off, and the cylinder H opened. When this is effected, the cylindrical barrel is removed.

In addition to the three layers of veneer there may be a stiffener in the bilge, which should be as thick as possible and should be located exactly in the middle. There may be also a small projection on the outside of the cylindrical die A, near both ends, arranged to form a square depression or rabbet in the composite sheet. Into this depression or rabbet the edges of the barrel-heads can be pressed and be held in this depression.

I declare that what I claim is—

1. In an apparatus for the production of barrels, pipes, or cylinders from layers of veneer, or the like, the combination with a fixed outer cylinder, of an inner expansible segmental die cylindrical on the exterior and oppositely inclined on the interior from an apex at or about the middle of the die toward the ends thereof, and oppositely-disposed cones coinciding with the inclined portions of said die and slidingly coupled to the respective segments thereof, whereby the longitudinal movement of said cones will expand or contract the die to compress or release the substance between the same and the outer fixed cylinder, substantially as described.

2. In an apparatus for the production of barrels, pipes, or cylinders from layers of veneer, or the like, the combination with a fixed outer cylinder, of an inner expansible segmental die cylindrical on the exterior and oppositely inclined on the interior from an apex at or about the middle of the die toward the ends thereof, and oppositely-disposed cones coinciding with the inclined portions of said die and slidingly coupled to the respective segments thereof, whereby the longitudinal movement of said cones will expand or contract the die to compress or release the substance between the same and the outer fixed cylinder, together with means for simultaneously actuating said cones, substantially as described.

3. In an apparatus for the production of barrels, pipes, or cylinders from layers of veneer, or the like, the combination with a fixed outer cylinder, of an inner expansible segmental die cylindrical on the exterior and oppositely inclined on the interior from an apex at or about the middle of the die toward the ends thereof, and oppositely-disposed cones coinciding with the inclined walls of said die and having sliding dovetail connections with the respective segments thereof, and means whereby the said cones are simultaneously moved in opposite directions to each other, substantially as described.

4. In an apparatus for the production of barrels, pipes, or cylinders from layers of veneer, or the like, the combination with a fixed outer cylinder, of an inner expansible segmental die cylindrical on the exterior and oppositely inclined on the interior from an apex at or about the middle of the die toward the ends thereof, the inclined portions of the respective segments of the die being provided with longitudinal dovetail grooves, oppositely-disposed cones coinciding with the inclined walls of said die and provided with plates or extensions fitted to the proximate grooves, and means for simultaneously moving said cones in opposite directions to each other, substantially as described.

5. In an apparatus for the production of barrels, pipes, or cylinders from layers of veneer, or the like, the combination with a fixed outer cylinder, of an inner expansible segmental die cylindrical on the exterior and oppositely inclined on the interior from an apex at or about the middle of the die toward the ends thereof, the adjacent edges of the segments of the die being provided from the interior to the exterior thereof with interlocking projections and recesses, oppositely-disposed cones coacting with the inclined surfaces of the respective segments and slidingly coupled thereto, and means for moving said cones in opposite directions to each other, substantially as described.

In witness whereof I have hereunto signed my name, this 29th day of April, 1899, in the presence of two subscribing witnesses.

J. H. J. BARTELS.

Witnesses:
  G. C. DYMOND,
  W. H. BEESTON.